Patented Oct. 17, 1950

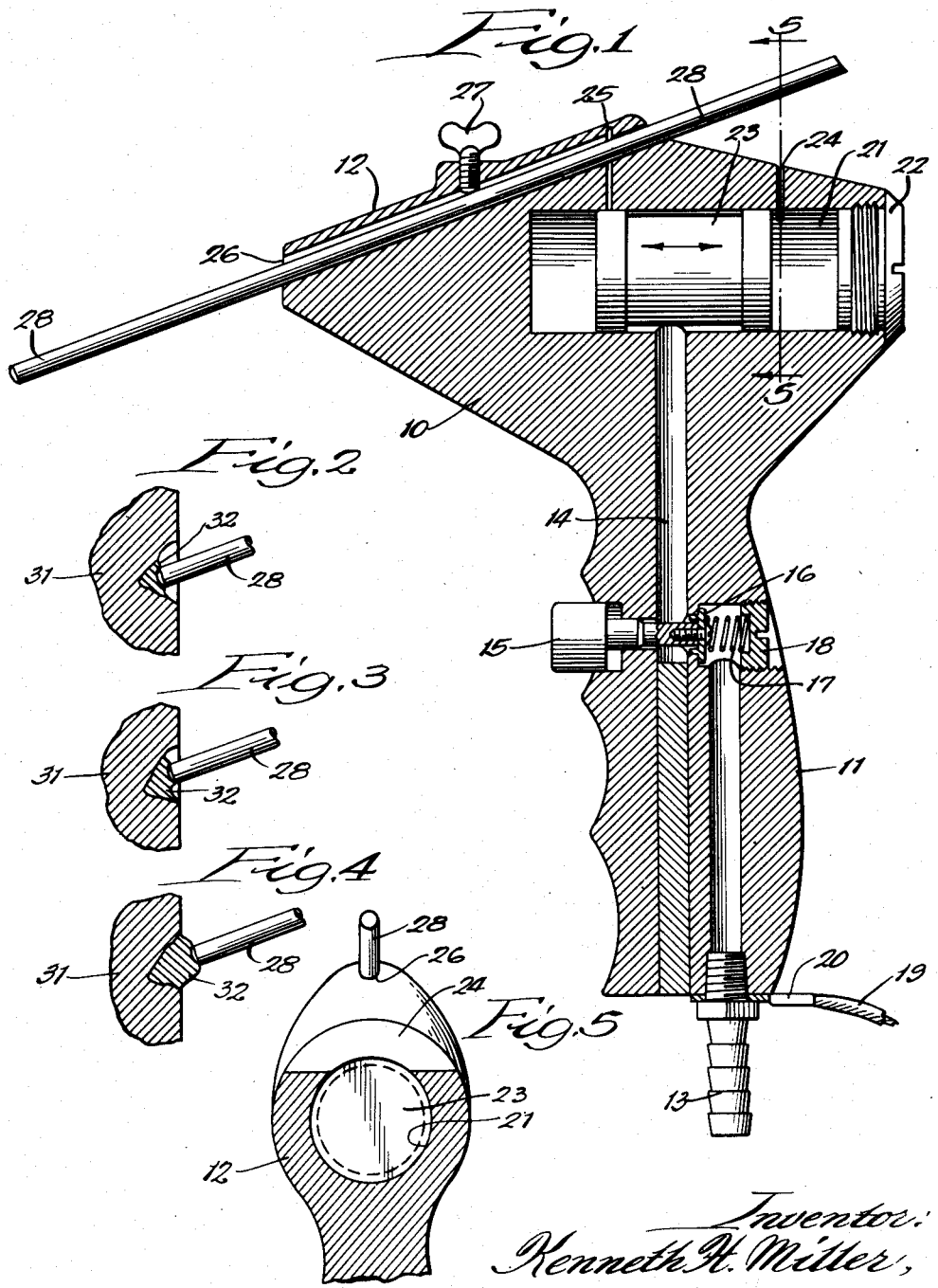

2,526,035

UNITED STATES PATENT OFFICE 2,526,035

WELDING APPARATUS

Kenneth H. Miller, Chicago, Ill., assignor to Mid-States Equipment Company, a corporation of Illinois Application August 22, 1945, Serial No. 612,004

3 Claims. (Cl. 219—8)

This invention relates to welding apparatus and has for its purpose the provision of an electric welding gun which simultaneously deposits and welds a mass of metal to the work and peens the metal down without any substantial heating of the work.

A further object of the invention is to provide a welding gun that can be easily handled and that can be used to weld small, dense particles to the work or can be used to build up substantial masses and deposits upon the work.

In the manufacture of metal articles substantial waste is caused because of defects in the newly fabricated materials caused by blow holes which frequently appear only after expensive machine work has been done upon the articles. Salvage of this material has long been attempted by the welding of metal at the defect but this frequently causes heat distortion and sets up stresses in the metal which render it unsuitable for use.

Similarly, in the salvaging and repair of cracked or worn metal articles it has been customary practice to attempt repair and rebuilding by the welding of metal to the article.

It is the object of this invention to permit the salvaging of defective and worn articles without any substantial heating of the work, thus avoiding any distortion or stresses of the repaired metal.

These and other features of the invention will be seen from the following detailed specification read in connection with the accompanying drawings forming part thereof and in which—

Fig. 1 is an elevation in section of the welding gun of this invention;

Figs. 2, 3 and 4, respectively, show the building up of a deposit of welded material upon a metal object; and Fig. 5 is a fragmentary section of the head of the welding gun of this invention taken on the line 5—5 of Fig. 1.

Referring to the drawings, the welding gun is indicated by the numeral 10. It is generally in the form of a portable air hammer with a pistol grip 11 and a head 12, which forms the body of the hammer. At the lower end of the pistol grip 11 is the air inlet lead 13 designed to be connected to a suitable supply of compressed air which enters the air passage 14. Intermediate the air passage 14 is the air valve 16 controlled by the air control valve button 15, which moves the valve 16 against the spring 17. The spring abuts against the abutment 18 which is threadedly mounted in the hammer handle 11 and can be rotated to alter the tension upon the spring 17 and the air valve 16.

The air control valve button can be manipulated by the forefinger of the hand by which the gun is held.

The upper portion of the air passage 14 leads into the air cylinder 21 which is bored into the head 12 at substantially the longitudinal axis thereof and capped by the cylinder head 22.

Within the air cylinder 21 is the reciprocating piston 23. Leading into the cylinder are also rear exhaust port 24 and the front exhaust port 25. Bored through the head 12 is the welding rod passage 26 through which the welding rod 28 is inserted. The bore 26 is slightly enlarged from the exhaust port 25 forward to the end of the bore. The retaining screw 27 is provided to adjust the length of the welding rod which is permitted to protrude beyond the front of the hammer head.

The work and a welded deposit being applied thereto is indicated by the numerals 31 and 32.

An electrical lead 19 is attached to the hammer in a suitable manner. In the preferred embodiment shown the lead is applied by means of a conventional terminal 20 secured to the base of the handle grip 11 by the air inlet lead 13.

The electrical lead 19 is one line of a circuit leading from a power supply of low voltage and high amperage such as is conventionally used in welding.

In the preferred embodiment herein disclosed, the electrical supply is from a transformer with an output of 600 to 800 amperes at 2 to 9 volts.

Method of operation

In order to operate this welding gun the air lead 13 is connected to a suitable supply of compressed air which, when the control button 15 is pressed by the forefinger, will vibrate the hammer head at a very rapid speed, in the conventional method of operation of portable air hammers. By variably depressing the control button 15, the speed of the hammer head and hence the frequency of the vibration may be controlled.

One side of the transformer output is connected to the electrical lead 19 and the other attached to the metal work 31.

An electrode rod 28 is inserted in the hammer head. This rod, in the preferred embodiment shown, is substantially one-eighth inch in diameter. The composition of this rod depends upon the metal which forms the work to which the weld is to be applied. If the work is aluminum, a pure aluminum welding rod is used. If the work is grey cast iron or other ferrous metal, a pure nickel rod is used. If the work is brass or bronze, a bronze rod is used.

With the welding rod 28 inserted in the hammer head 27, the protruding end of the rod is brought to the work and simultaneously the air control valve 15 is pressed. The hammer thereupon begins to vibrate in a short range, forcing the electrode rod 28 against the work 31 with short and vigorous hammer blows. With the electrical circuit connected at each contact of the rod 28 with the work, a brief arc is established and a minute particle of the metal rod 28 forcibly deposited upon the work 31. The arc is instantly broken by the reverse movement of the hammer and as the hammer again moves forward, the arc is reestablished and another minute particle of metal is deposited upon the work 31. This process continues as long as the gun is held to the work with the air control valve open and the electrical circuit established.

As the movement of the hammer is quick and vigorous, the end of the welding rod 28 also peens the previously deposited metal each time it strikes the work 31 or the metallic mass 32 being deposited thereon.

The air hammer thus serves both as a hammer to peen the growing deposit of metal 32 and as an interrupter to break the electrical circuit and to create the arc necessary for welding. Because of this combined welding and peening action, the metallic deposit 32 is unusually dense and when the repaired area has been finished and polished, the repair can seldom be detected. X-ray examination discloses the repair as an inlay and photomicrographs reveal that it is a perfect mass with good juncture with the work and no evident lines of demarcation.

In the operation of the hammer the temperature of the work is kept very low, not to exceed around 125° F. Upon cessation of the welding operation the repaired area can be touched and handled within fifteen seconds. The welding is thus effected without any heat distortion or the setting up of any stresses in the metal.

The exhausting of the air from the front port 25, which leads into the welding rod bore 26, also forces a constant stream of air about the welding rod 28 during operation of the welding gun and thus constantly cools the welding rod.

Having thus shown and described one embodiment of the invention, it is to be understood that it is capable of many modifications. Changes, therefore, in the construction and arrangement may be made without departing from the spirit and scope of the invention as disclosed in the appended claims, in which it is intended to claim all novelty inherent in the invention as broadly as permissible, in view of the prior art.

I claim:

1. A welding gun for depositing and peening metallic material on metallic objects comprising a body member, a metallic electrode carried by the body member for establishing a welding arc between the metallic electrode and the metallic object for depositing metallic material from the electrode on the metallic object, and means in the body member for vibrating the electrode into and out of engagement with the object for intermittently making and breaking the welding arc to intermittently deposit metallic material on the object and for simultaneously peening the metallic material deposited on the object.

2. A welding gun for depositing and peening metallic material on metallic objects comprising a body member adapted to rigidly support a metallic electrode for establishing a welding arc between the metallic electrode and the metallic object for depositing metallic material from the electrode on the metallic object, and means in the body member to vibrate the body member and hence the electrode into and out of engagement with the object for intermittently making and breaking the welding arc to intermittently deposit metallic material on the object and for simultaneously peening the metallic material deposited on the object.

3. A welding gun for depositing and peening metallic material on metallic objects comprising a body member adapted to rigidly support a metallic electrode for establishing a welding arc between the metallic electrode and the metallic object for depositing metallic material from the electrode on the metallic object, and an air hammer in the body member to vibrate the body member and hence the electrode into and out of engagement with the object for intermittently making and breaking the welding arc to intermittently deposit metallic material on the object and for simultaneously peening the metallic material deposited on the object.

KENNETH H. MILLER.

REFERENCES CITED

The following references are of record in the file of this patent:

UNITED STATES PATENTS

| Number | Name | Date |
|---|---|---|
| 1,534,688 | Collins | Apr. 21, 1925 |
| 1,788,201 | Murray et al. | Jan. 6, 1931 |
| 1,984,809 | Requa | Dec. 18, 1934 |
| 2,383,383 | Harding | Aug. 21, 1945 |